US010450208B2

(12) United States Patent
Kuznetsov et al.

(10) Patent No.: US 10,450,208 B2
(45) Date of Patent: Oct. 22, 2019

(54) ENHANCED FLOCCULATION AND CLARIFICATION OF PRODUCED WATER USING NANOPARTICLES

(71) Applicant: Baker Hughes, Houston, TX (US)

(72) Inventors: Oleksandr Kuznetsov, Houston, TX (US); Radhika Suresh, Sugar Land, TX (US); Valery Khabashesku, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 297 days.

(21) Appl. No.: 15/170,739

(22) Filed: Jun. 1, 2016

(65) Prior Publication Data

US 2017/0349461 A1    Dec. 7, 2017

(51) Int. Cl.
*C02F 1/52* (2006.01)
*C02F 1/54* (2006.01)
*C02F 103/10* (2006.01)
*C02F 1/56* (2006.01)

(52) U.S. Cl.
CPC ............ *C02F 1/5236* (2013.01); *C02F 1/545* (2013.01); *C02F 1/56* (2013.01); *C02F 2103/10* (2013.01); *C02F 2305/08* (2013.01)

(58) Field of Classification Search
CPC .................................................. C02F 1/5236
See application file for complete search history.

(56) References Cited

U.S. PATENT DOCUMENTS

| | | | | |
|---|---|---|---|---|
| 9,840,669 B2* | 12/2017 | Kuznetsov | ............. | B03D 1/018 |
| 2003/0220204 A1* | 11/2003 | Baran, Jr. | ............. | B82Y 30/00 |
| | | | | 507/200 |
| 2009/0266766 A1* | 10/2009 | Huang | ................ | B01J 20/0211 |
| | | | | 210/684 |
| 2011/0135797 A1 | 6/2011 | Li et al. | | |
| 2012/0029120 A1* | 2/2012 | Soane | ..................... | C01D 3/14 |
| | | | | 524/7 |

OTHER PUBLICATIONS

BGC Engineering Inc; Oil Sands Tailings Technology Review; Oil Sands Research and Information Network; 2010; 136 pp.; OSRIN Report No. TR-1; University of Alberta, School of Energy and the Environment; Edmonton, Alberta.
M. Davies; Water Treatment Processes and Equipment; p. 419-455; ISBN: 1-57590-204-4; Oilfield Water Technology.

* cited by examiner

*Primary Examiner* — Peter Keyworth
(74) *Attorney, Agent, or Firm* — Greenberg Traurig LLP

(57) ABSTRACT

Various illustrative embodiments of a process for enhanced flocculation and clarification of produced water from oil and gas wells using nanoparticles are provided herein. Certain nanoparticles can increase the settling rate of solids in produced water when used alone or combined with certain conventional flocculents.

12 Claims, 5 Drawing Sheets

Effect of cationic nanosilica colloid on settling rate.

Effect of anionic nanosilica on settling rate.

Effect of alumina nanoparticles on settling rate.

Effect of cationic nanosilica powder on settling rate.

Effect of cationic nanosilica colloid on settling rate.

Effect of magnesium oxide powder on settling rate.

ENHANCED FLOCCULATION AND CLARIFICATION OF PRODUCED WATER USING NANOPARTICLES

FIELD OF THE INVENTION

The presently disclosed subject matter relates to flocculation and clarification of produced water from oil and gas wells and oil sands mining.

BACKGROUND

Large quantities of water are produced during oil and gas operations. For example, 2.2 cubic meters of waste water (on average) can be generated per 1 barrel of oil extracted during oil sands mining operations. In some cases, the waste water can contain 30 weight % or more of suspended solids known as "tailings." The tailings can consist of water, silt and clays which can become mature fine tailings (MFT) over time.

The mature fine tailings can remain suspended in a tailings disposal pond because of the low sedimentation/consolidation rate, and can precipitate out over a prolonged period of time (sometimes up to 30 years). This can have a significant negative environmental impact, as the land under tailings ponds cannot be reclaimed for several decades. Also, water from tailing ponds cannot be recycled due to the presence of stable fine particles.

Chemical aids such as flocculents and coagulants have been widely employed in order to reduce settling time for solids in tailing ponds. However, these chemical aids only reduce settling time by a marginal amount (to approximately 10 years) and may change the chemical composition of treated water. It is desired to further reduce settling time and minimize environmental impact from oil sands mining operations. Thus, improvements in this field of technology are desired.

SUMMARY

Various illustrative embodiments of a method of separating mature fine tailings from a suspension comprising mature fine tailings and water are disclosed herein. In certain aspects, inorganic nanoparticles can be introduced into the suspension such that the inorganic nanoparticles interact with the mature fine tailings. The nanoparticles can be dispersed into the suspension. The inorganic nanoparticles can have a diameter of 50 nanometers or smaller. The inorganic nanoparticles can have a diameter of 20 nanometers or smaller. A flocculent can be dispersed in the suspension such that the flocculent interacts with the mature fine tailings. The flocculent can be an anionic polyacrylamide. The inorganic nanoparticles can include magnesium oxide nanoparticles. The inorganic nanoparticles can include alumina nanoparticles. The inorganic nanoparticles can include silica nanoparticles. The silica nanoparticles can include an amine-terminated nanosilica powder. The silica nanoparticles can include an amine-terminated nanosilica colloid.

Various illustrative embodiments of a method of separating solid materials from a suspension of produced water comprising solid materials and water from an oil and gas well are also provided herein. In certain aspects, inorganic nanoparticles can be introduced into the suspension such that the inorganic nanoparticles interact with the solid materials. The nanoparticles can be dispersed into the suspension. The inorganic nanoparticles can have a diameter of 50 nanometers or smaller. The inorganic nanoparticles can have a diameter of 20 nanometers or smaller. A flocculent can be dispersed in the suspension such that the flocculent interacts with the mature fine tailings. The flocculent can be an anionic polyacrylamide. The inorganic nanoparticles can include magnesium oxide nanoparticles. The inorganic nanoparticles can include alumina nanoparticles. The inorganic nanoparticles can include silica nanoparticles. The silica nanoparticles can include an amine-terminated nanosilica powder. The silica nanoparticles can include an amine-terminated nanosilica colloid.

Figure 1:
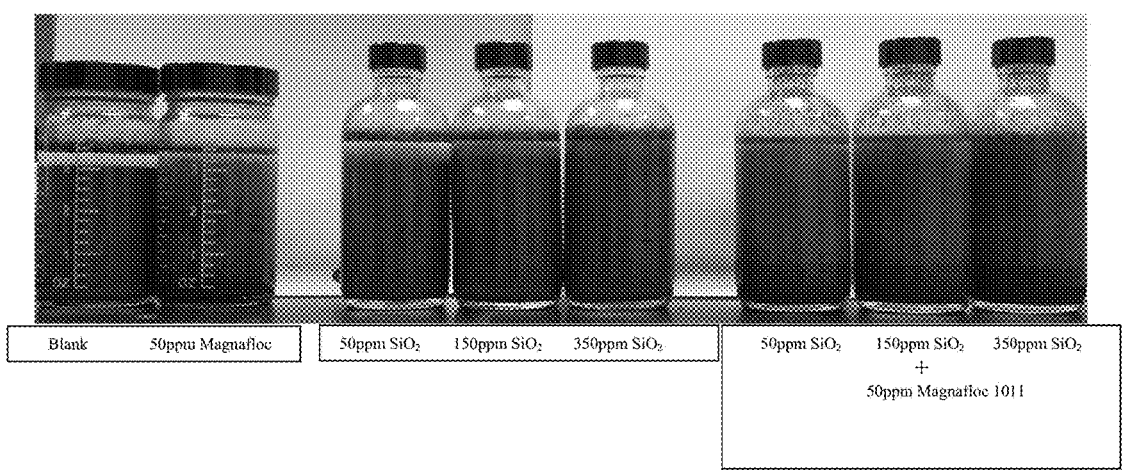
FIG. 1 is an illustration of the effect of anionic nanosilica on settling rate of tailings in an illustrative embodiment of the presently disclosed subject matter.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

Disclosed herein are various illustrative embodiments of a process for enhancing flocculation and/or clarification of produced water from oil and gas wells using nanoparticles. As used herein, the term "produced water" means water that is produced as a byproduct along with oil and gas from an oil and gas operation, including but not limited to tailings water. In general, it has been found that certain nanoparticles can increase the settling rate of solids in produced water especially when combined with certain conventional flocculents.

In certain illustrative embodiments, a method of separating solid materials from a suspension of produced water comprising solid materials and water from an oil and gas well is provided, wherein a plurality of inorganic nanoparticles are introduced into the suspension.

In certain illustrative embodiments, a method of separating mature fine tailings from a suspension comprising mature fine tailings and water is also provided, wherein a plurality of inorganic nanoparticles are introduced into the suspension.

Without wishing to be bound by theory, it is believed that the nanoparticle charges can neutralize the surface charges on the fine tailings or other solid materials without materially affecting the hardness of the water. For example, the nanoparticles can be dispersed into the suspension and adsorb onto the surface of the fines thus producing denser flocks with higher settling rates. The reduced charge on the fine tailings allows them to come into closer contact when interacting with flocculent, thus forming even larger flocks. Thus, the settling time for fine tailings can be reduced at least twofold when flocculent is combined with nanoparticles, in certain illustrative embodiments.

In certain illustrative embodiments, a flocculent can be introduced in the suspension along with the nanoparticles. For example, the flocculent can be an anionic polyacrylamide such as Magnafloc®1011. Magnafloc®1011 is a high molecular weight anionic polyacrylamide (PAM) flocculant supplied as a free flowing granular powder with a particle size of 98%<1000 μm. The molecular weight of Magnafloc®1011 is approximately 15 million Da. Magnafloc®1011 is commercially available from BASF. This flocculent is widely used by the mining industry for tailings water treatment. It is also used in oil sands mining.

In certain illustrative embodiments, the inorganic nanoparticles can be one or more of magnesium oxide, alumina, iron oxide, amine-terminated nanosilica powder and amine-terminated silica colloid nanoparticles such as anionic nanosilica. These various types of inorganic multivalent nanoparticles have been shown to have positive results when used alone or by enhancing the effect of the flocculent on the produced water suspension, in certain illustrative embodiments.

In certain illustrative embodiments, the inorganic nanoparticles can have a diameter of 50 nanometers or smaller. In certain illustrative embodiments, the inorganic nanoparticles can have a diameter of 20 nanometers or smaller. Smaller nanoparticles have more surface area available for contact with tailings fines. Hence, surface charge neutralization by nanoparticles is more efficient in certain illustrative embodiments.

In general, produced water must have low solids content and high clarity before being used for certain oil and gas applications. Nanoparticles with larger surface area can carry higher surface charge density and can therefore serve as effective coagulants in water treatment. By adsorbing onto the surfaces of clay and minerals suspended in the produced water, the nanoparticles can form dense flocs and accelerate settling. Water treatment with nanoparticles can be especially beneficial for mature fine tailings generated in oil sands operations such as bitumen extraction processes.

In certain illustrative embodiments, a fines fixing agent can be used for treatment of mature fine tailings through a filtration mechanism. A representative example of a fines fixing agent is ConFine™, which is commercially available from Baker Hughes Inc. ConFine™ comprises magnesium oxide nanoparticles coated onto sand grains and can be effective in clay and mineral particles adsorption from tailings water. In certain illustrative embodiments, the coating on the Confine™ sand can be replaced with one or more of the inorganic nanoparticles described herein.

To facilitate a better understanding of the presently disclosed subject matter, the following examples of certain aspects of certain embodiments are given. In no way should the following examples be read to limit, or define, the scope of the presently disclosed subject matter.

Examples

The effect of nanoparticles and the combined effect of nanoparticles and commercial flocculent on the settling of solids in tailings water were each studied. Four types of nanoparticles were investigated: (i) alumina (<50 nm); (ii) cationic nanosilica (10-20 nm) (powder and colloid); (iii) anionic nanosilica (5 nm); and (iv) magnesium oxide (30 nm).

In a typical experiment, 25 ml of mature fine tailings (MFT) water was added into a 100 ml bottle. The MFT water contained 40 weight % of solids—mostly sand and delaminated clay particles. The MFT water was diluted four (4) times with processed water. The final volume of fluids was 100 ml. Magnafloc®1011 (Percol 727) was used as a flocculent for MFT treatment.

The effect of nanoparticle additives was determined relative to a blank sample (MFT water with no chemicals added) as well as relative to MFT water treated with 50 ppm of Magnafloc®1011. Additionally, 3 concentrations of nanoparticles were used in all experiments—50 ppm, 150 ppm and 350 ppm. Finally, the combined effect of Magnafloc®1011 and nanoparticles was studied by adding 50 ppm of Magnafloc® and nanoparticles. Settling was monitored for 10 days. Overall, 32 samples were tested.

All samples are listed in the first column of Table 1 below:

TABLE 1

| | | | | |
|---|---|---|---|---|
| | | Total volume: 100 ml | | |
| Sample | Tailings Water, ml | Processed Water, ml | 1% NP Suspension, ml | 100 ppm Magnafloc ® solution, ml |
| Blank | 25 | 75 | | |
| 50 ppm Magnafloc | 25 | 25 | | 50 |
| 50 ppm MgO powder (30 nm) | 25 | 74.5 | 0.5 | |
| 150 ppm MgO | | 73.5 | 1.5 | |
| 350 ppm MgO | | 71.5 | 3.5 | |
| 50 ppm cationic nanosilica 1 (10-20 nm) | 25 | 74.5 | 0.5 | |
| 150 ppm cationic nanosilica 1 | | 73.5 | 1.5 | |
| 350 ppm cationic nanosilica 1 | | 71.5 | 3.5 | |
| 50 ppm cationic nanosilica 2 (20 nm) | 25 | 74.5 | 0.5 | |
| 150 ppm cationic nanosilica 2 | | 73.5 | 1.5 | |
| 350 ppm cationic nanosilica 2 | | 71.5 | 3.5 | |
| 50 ppm $Al_2O_3$ powder (<50 nm) | 25 | 74.5 | 0.5 | |
| 150 ppm $Al_2O_3$ | | 73.5 | 1.5 | |
| 350 ppm $Al_2O_3$ | | 71.5 | 3.5 | |
| 50 ppm anionic nanosilica (5 nm) | 25 | 74.5 | 0.5 | |
| 150 ppm anionic nanosilica | | 73.5 | 1.5 | |
| 350 ppm anionic nanosilica | | 71.5 | 3.5 | |
| 50 ppm Magnafloc + 50 ppm MgO powder | 25 | 24.5 | 0.5 | 50 |
| 150 ppm MgO | | 23.5 | 1.5 | |
| 350 ppm MgO | | 21.5 | 3.5 | |
| 50 ppm cationic nanosilica 1 | 25 | 24.5 | 0.5 | 50 |

TABLE 1-continued

Total volume: 100 ml

| Sample | Tailings Water, ml | Processed Water, ml | 1% NP Suspension, ml | 100 ppm Magnafloc ® solution, ml |
|---|---|---|---|---|
| 150 ppm cationic nanosilica 1 | | 23.5 | 1.5 | |
| 350 ppm cationic nanosilica 1 | | 21.5 | 3.5 | |
| 50 ppm cationic nanosilica 2 | 25 | 24.5 | 0.5 | 50 |
| 150 ppm cationic nanosilica 2 | | 23.5 | 1.5 | |
| 350 ppm cationic nanosilica 2 | | 21.5 | 3.5 | |
| 50 ppm Al$_2$O$_3$ powder | 25 | 24.5 | 0.5 | 50 |
| 150 ppm Al$_2$O$_3$ | | 23.5 | 1.5 | |
| 350 ppm Al$_2$O$_3$ | | 21.5 | 3.5 | |
| 50 ppm anionic nanosilica | 25 | 24.5 | 0.5 | 50 |
| 150 ppm anionic nanosilica | | 23.5 | 1.5 | |
| 350 ppm anionic nanosilica | | 21.5 | 3.5 | |

Anionic Nanosilica

FIG. 1 shows the effects of anionic nanosilica and anionic nanosilica+Magnafloc® on fines settling in MFT after 10 days of settling. As can be seen from FIG. 1, after 10 days of settling without adding any chemicals, the solids level is near the '3 oz' mark on the bottle (far left bottle). Magnafloc®1011 treatment caused settling of coarse solids ($2^{nd}$ bottle from the left) such that the level of coarse solids is near the '2 oz' mark. Suspension above this level contains fine solids dispersed in water. It does not appear that Magnafloc®1011 is very effective in precipitating fines solids in MFT. One reason could be the higher viscosity of water due to addition of a high molecular weight polymer.

Bottles 3 to 5 contain 50 ppm anionic nanosilica ($3^{rd}$ bottle from the left), 150 ppm ($4^{th}$ bottle from the left) and 350 ppm ($5^{th}$ bottle from the left). It can be seen that anionic nanosilica, when added alone, tends to stabilize fines.

However, when anionic nanosilica is added along with 50 ppm of Magnafloc®1011 (last three bottles), the solids stability is not impacted significantly. The coarse solids level is found to be even lower than for treatment with Magnafloc® alone. Fines are more stable at higher dosages of nanosilica. Adsorption of silica nanoparticles on the surface of fines increases the surface area which can be exposed to flocculent polymer chains. This speeds up the settling of coarse solids, thus leaving finer solids suspended.

Alumina (<50 nm).

Figure 2:
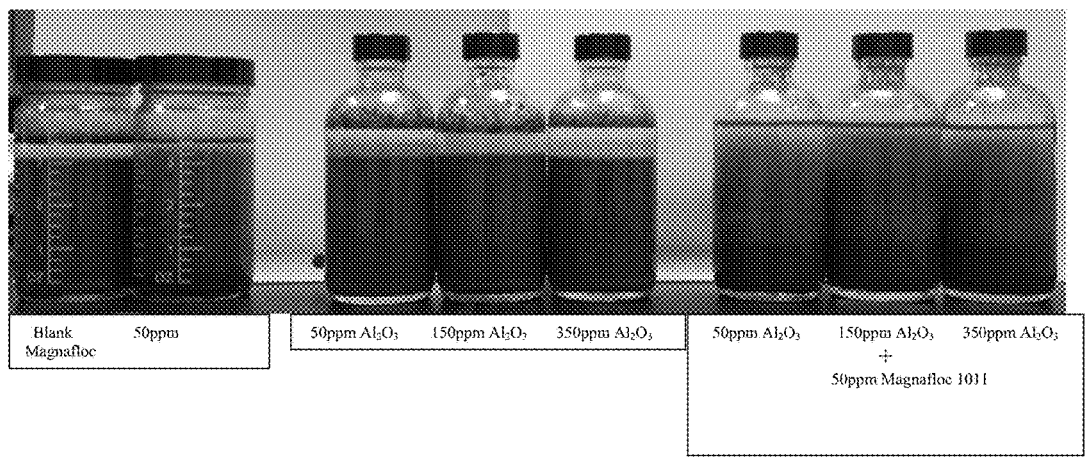
FIG. 2 is an illustration of the effect of alumina nanoparticles on settling rate of tailings in an illustrative embodiment of the presently disclosed subject matter.

FIG. 2 shows the effects observed from use of alumina nanoparticles. Alumina is expected to be positively charged at pH 7. Isoelectric potential for this material is around 9, which means that alumina particles have a slightly positive charge in neutral water.

Unlike silica, alumina possesses a positive surface charge which neutralizes the negative charge on MFT solids surfaces and speeds up settling. 10 days of settling produced more clear water in the top layer than Magnafloc® alone. When alumina and Magnafloc® flocculent were used together, coarse solids settled down much faster, but fines remain suspended for prolonged periods due to the higher viscosity caused by the Magnafloc® polymer.

Amine-Terminated Nanosilica Powder (Cationic) (10-20 nm).

Figure 3:
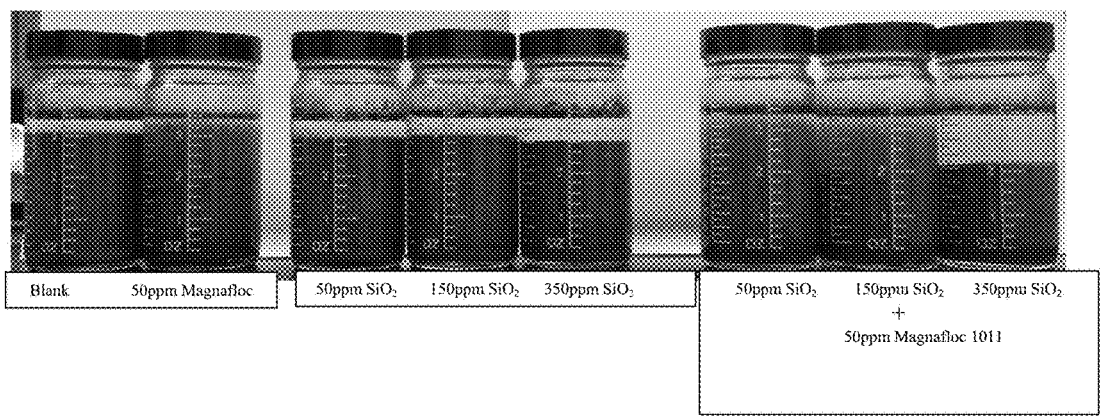
FIG. 3 is an illustration of the effect of nanosilica powder on settling rate of tailings in an illustrative embodiment of the presently disclosed subject matter.

FIG. 3 shows the effects observed from use of amine-terminated nanosilica powder. Amine-terminated nanosilica powder has a zeta-potential of around +10 mV and is unstable in water. It can be stable as an aqueous dispersion for less than 1 hour. However, positive surface charge seems to neutralize surface charges on solids and destabilizes the solids.

When combined with flocculent, nanosilica powder at 350 ppm produced clear water settling down both coarse and fine solids (far right bottle). At the same time, the level of settled solids was near the '2 oz' mark, which is similar to the sample where MFT was treated with only 50 ppm of Magnafloc® ($2^{nd}$ bottle from left). In contrast, released water was much more clear and transparent for the combined addition of nanoparticles and flocculent.

Amine-Terminated Nanosilica Colloid (Cationic) (20 nm).

Figure 4:
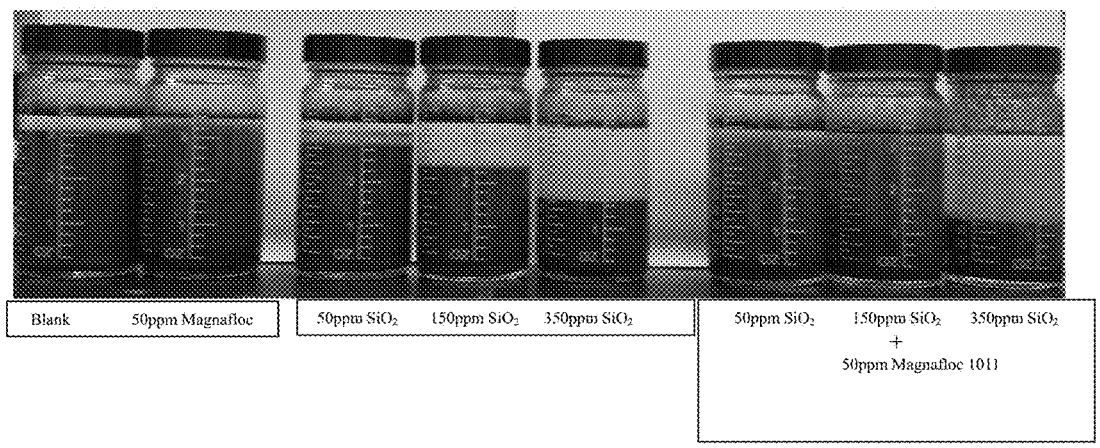
FIG. 4 is an illustration of the effect of nanosilica colloid on settling rate of tailings in an illustrative embodiment of the presently disclosed subject matter.

FIG. 4 shows the effects observed from use of an amine-terminated nanosilica colloid. The amine-terminated nanosilica colloid was formed as stable suspension of 1 weight % silica nanoparticles in water. The zeta-potential was found to be +20 mV. This material, even if used by itself, produced clear water at concentrations as low as 150 ppm. The amount of released clear water was similar to 50 ppm of Magnafloc® addition. However, the quality of this water is visibly much higher (compare to FIG. 3).

At higher concentrations (350 ppm) the nanosilica colloid outperforms the commercial flocculent. At the same time, when nanosilica is combined with flocculent, settling rate changes unfavorably due to higher viscosity of water.

Magnesium Oxide Powder (30 nm).

Figure 5:
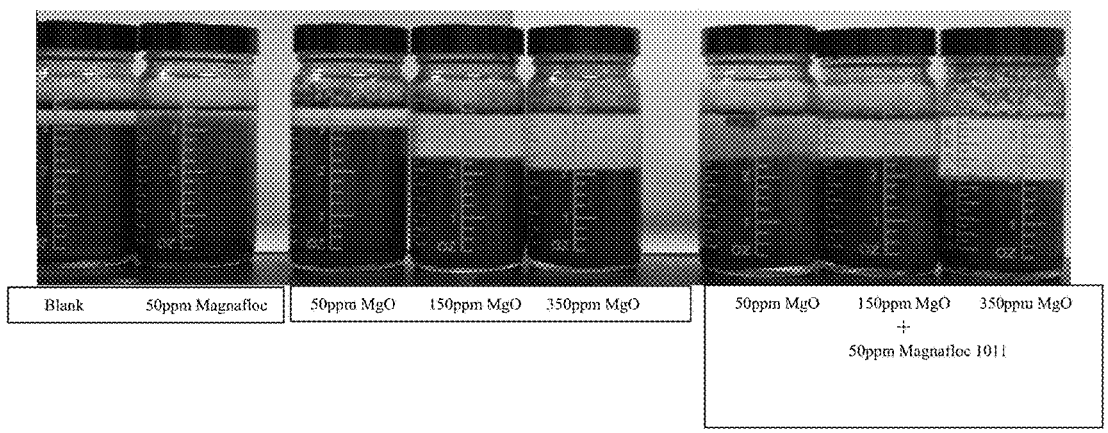
FIG. 5 is an illustration of the effect of magnesium oxide powder on settling rate of tailings in an illustrative embodiment of the presently disclosed subject matter.

FIG. 5 shows the effects observed from use of magnesium oxide powder. Magnesium oxide powder was used to prepare a suspension in water for MFT settling tests. MgO is not stable and precipitates within 10-15 minutes. It was observed that MgO significantly outperforms Magnafloc®1011 at concentrations as low as 150 ppm producing clear water free of fines (FIG. 3). Coarse solids seem to be settling at the same rate when compared with Magnafloc® treatment. A combination of MgO and Magnafloc® demonstrated very good performance when 50 ppm of each additive was used. Higher dosages of MgO improve quality of water by settling fines.

To summarize the test results, it was found that surface charged nanoparticles promote coagulation and flocculation of tailings fines. Positively charged nanoparticles tend to neutralize tailing fines surface charge while negatively charged nanoparticles bridge larger particles to form flocks.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter. Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

What is claimed is:

1. A method of separating mature fine tailings from a suspension comprising mature fine tailings and water, the method comprising:
   dispersing inorganic nanoparticles into the suspension such that the inorganic nanoparticles interact with the mature fine tailings, the inorganic nanoparticles having a diameter of 50 nanometers or smaller, wherein the inorganic nanoparticles comprise an amine-terminated nanosilica that promotes coagulation of the mature fine tailings; and
   introducing a flocculent in the suspension such that the flocculent interacts with the mature fine tailings.

2. The method of claim 1, wherein the inorganic nanoparticles have a diameter of 20 nanometers or smaller.

3. The method of claim 1, wherein the flocculent is an anionic polyacrylamide.

4. The method of claim 1, wherein the inorganic nanoparticles comprise an amine-terminated nanosilica powder.

5. The method of claim 1, wherein the inorganic nanoparticles comprise an amine-terminated nanosilica colloid.

6. The method of claim 1, wherein the dispersed nanoparticles are adsorbed onto the surfaces of the mature fine tailings in the suspension.

7. A method of separating solid materials from a suspension of produced water comprising solid materials and water from an oil and gas well, the method comprising:
   dispersing inorganic nanoparticles into the suspension such that the inorganic nanoparticles interact with the solid materials, the inorganic nanoparticles having a diameter of 50 nanometers or smaller, wherein the inorganic nanoparticles comprise an amine-terminated nanosilica that promotes coagulation of the solid materials, and
   introducing a flocculent into the suspension such that the flocculent interacts with the solid materials.

8. The method of claim 7, wherein the inorganic nanoparticles have a diameter of 20 nanometers or smaller.

9. The method of claim 7, wherein the flocculent is an anionic polyacrylamide.

10. The method of claim 7, wherein the inorganic nanoparticles comprise an amine-terminated nanosilica powder.

11. The method of claim 7, wherein the inorganic nanoparticles comprise an amine-terminated silica colloid.

12. The method of claim 7, wherein the dispersed nanoparticles are adsorbed onto the surfaces of the solid materials suspended in the produced water.

* * * * *